United States Patent
Goh et al.

(10) Patent No.: US 12,526,385 B2
(45) Date of Patent: Jan. 13, 2026

(54) INFORMATION HANDLING SYSTEM CAMERA WITH DIRECT ACCESS SETTINGS AND AUTOMATED PRESENTATION POSITIONING

(71) Applicant: Dell Products L.P., Round Rock, TX (US)

(72) Inventors: Chun Long Goh, Singapore (SG); Peng Lip Goh, Singapore (SG); Suet Chan Law, Singapore (SG); Yu Weng Alvin Sitoh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 260 days.

(21) Appl. No.: 17/511,052

(22) Filed: Oct. 26, 2021

(65) Prior Publication Data

US 2023/0126024 A1    Apr. 27, 2023

(51) Int. Cl.
| | |
|---|---|
| *H04N 7/15* | (2006.01) |
| *G06F 1/16* | (2006.01) |
| *G06F 3/044* | (2006.01) |
| *G06F 3/0482* | (2013.01) |
| *G09G 5/00* | (2006.01) |
| *H04N 7/10* | (2006.01) |

(52) U.S. Cl.
CPC ............. *H04N 7/15* (2013.01); *G06F 1/1686* (2013.01); *G06F 3/044* (2013.01); *G06F 3/0482* (2013.01); *G09G 5/003* (2013.01); *H04N 7/102* (2013.01); *G06F 2203/04101* (2013.01); *G06F 2203/04803* (2013.01); *G09G 2354/00* (2013.01)

(58) Field of Classification Search
CPC ......... G06F 1/1686; G09G 5/003; H04N 7/15
See application file for complete search history.

(56) References Cited

U.S. PATENT DOCUMENTS

| | | | |
|---|---|---|---|
| 7,127,163 B2 | 10/2006 | Lee et al. | |
| 7,728,963 B2 | 6/2010 | Kirschner | |
| 7,830,628 B2 | 11/2010 | Schaefer | |
| 8,139,028 B2 | 3/2012 | Warren | |
| 8,169,185 B2 | 5/2012 | Partovi et al. | |
| 8,541,975 B2 | 9/2013 | Park et al. | |
| 8,564,544 B2 | 10/2013 | Jobs et al. | |
| 8,639,106 B1 | 1/2014 | Gleason et al. | |
| 8,878,811 B1 | 11/2014 | Baumbach | |
| 9,035,903 B2 | 5/2015 | Binstead | |

(Continued)

FOREIGN PATENT DOCUMENTS

| | | |
|---|---|---|
| EP | 3846142 A1 | 7/2021 |
| WO | 2019231642 A1 | 12/2019 |

*Primary Examiner* — Andrea C Leggett
(74) *Attorney, Agent, or Firm* — Zagorin Cave LLP; Robert W. Holland (57) ABSTRACT

An information handling system touch screen display and peripheral camera cooperate to coordinate presentation of visual images related to camera operations. For example, in one embodiment a tap on the camera housing commands presentation of a settings on screen display menu generated by a controller of the camera. In another example, a touch screen of the display detects a position of the camera by its capacitive effects to adjust presentation of visual images at the display, such as moving the settings on screen display menu to a position proximate the camera or adjusting a video conference presentation around the camera position.

17 Claims, 7 Drawing Sheets

(56) References Cited

U.S. PATENT DOCUMENTS

| | | |
|---|---|---|
| 9,105,255 B2 | 8/2015 | Brown et al. |
| 9,398,258 B1 | 7/2016 | Sandvik et al. |
| 9,628,688 B2 | 4/2017 | Martin et al. |
| 9,753,591 B2 | 9/2017 | Bui et al. |
| 9,813,599 B1 | 11/2017 | Wang et al. |
| 10,182,210 B1* | 1/2019 | Goetzinger, Jr. ..... H04L 65/403 |
| 10,266,125 B2 | 4/2019 | Wang |
| 10,491,806 B2 | 11/2019 | Lai et al. |
| 10,951,863 B2 | 3/2021 | Marutani et al. |
| 11,323,686 B2 | 5/2022 | Sheridan |
| 2003/0058363 A1 | 3/2003 | Boyden et al. |
| 2004/0090533 A1 | 5/2004 | Dow et al. |
| 2004/0254982 A1* | 12/2004 | Hoffman ............... H04L 69/329 |
| | | 709/204 |
| 2004/0263636 A1* | 12/2004 | Cutler .................. H04N 7/15 |
| | | 348/211.3 |
| 2006/0285747 A1* | 12/2006 | Blake .................. G06T 7/162 |
| | | 382/180 |
| 2010/0245532 A1* | 9/2010 | Kurtz .................. G06V 20/40 |
| | | 348/14.03 |
| 2011/0193935 A1 | 8/2011 | Gorzynski |
| 2011/0260681 A1 | 10/2011 | Guccione et al. |
| 2015/0036047 A1 | 2/2015 | Bledsoe |
| 2017/0063141 A1 | 3/2017 | Kim et al. |
| 2017/0205987 A1 | 7/2017 | Martin et al. |
| 2018/0295328 A1* | 10/2018 | Tucker .................. H04N 7/183 |
| 2019/0230259 A1 | 7/2019 | Germe et al. |
| 2019/0260863 A1 | 8/2019 | Kinouchi |
| 2019/0369836 A1* | 12/2019 | Faulkner ............. G06F 3/04845 |
| 2019/0373214 A1 | 12/2019 | Gurr et al. |
| 2020/0074154 A1* | 3/2020 | el Kaliouby .......... G06V 40/171 |
| 2020/0201522 A1* | 6/2020 | Faulkner ............... G06F 3/0485 |
| 2020/0288045 A1 | 9/2020 | Jeong et al. |
| 2020/0314299 A1 | 10/2020 | Okuley |
| 2021/0099030 A1 | 4/2021 | Walton et al. |
| 2022/0006889 A1 | 1/2022 | Scalisi |
| 2023/0045803 A1 | 2/2023 | Wallace |
| 2023/0108250 A1 | 4/2023 | Kra et al. |
| 2023/0262317 A1* | 8/2023 | O'Leary ................ H04N 5/272 |
| | | 348/14.03 |

\* cited by examiner

INFORMATION HANDLING SYSTEM CAMERA WITH DIRECT ACCESS SETTINGS AND AUTOMATED PRESENTATION POSITIONING

BACKGROUND OF THE INVENTION

Field of the Invention

The present invention relates in general to the field of information handling system cameras, and more particularly to an information handling system camera with direct access settings and automated presentation positioning.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate a processor and memory to execute instructions that process information and typically present the information as visual images at a display. Generally, information handling systems present the information as visual images at peripheral displays interfaced through a cable, such as a Type C USB cable. In addition, information handling system interface with other peripheral devices, such as peripheral cameras that support video conferencing, often called web cameras. For example, an end user may use a peripheral display and a peripheral camera to participate in a video conference with an application executing on an information handling system. Generally, the video conference will show other participants in video conference windows as visual images if the other participants are received through a network, and will also show the view captured by the end user's own peripheral camera in a separate window. Often, the video conference will include presentations and other information that is shared between the video conference participants. In some instances, the video conference windows and the presentations can result in a cluttered display presentation.

Recently, many peripheral displays have increased the area for presentation of visual images with larger display panels and curved displays. An advantage of a larger display is that an end user can view a complete video conference with presentations and data in one viewing space. Generally, with a larger display screen end users tend to arrange the display at a greater distance from their viewing position so that all of the presented information can be viewed. A difficulty that can arise with this setup is that a peripheral camera mounted to the display has an excessive distance to the end user so that visual images captured by the peripheral camera have a lower quality, such as a lower resolution when the system performs a virtual zoom into a facial image. One alternative to using a virtual zoom is to adjust the camera settings so that an optical zoom captures a better visual image. A difficulty with changing camera settings is that the end user typically has to enter into settings maintained by the operating system to adjust peripheral camera operations. This type of adjustment takes time and is often viewed by an end user as complex. Even with an optical zoom, the quality of the image may fall compared with an image captured at a closer range. An alternative is to place the peripheral camera on a stand between the end user and the display. A difficulty with this approach is that the peripheral camera can block the end user from seeing part of the display presentation. Further, the end user may appear strange from the perspective of other video conference participants if the end user looks at the display presentation instead of looking into the peripheral camera itself.

SUMMARY OF THE INVENTION

Therefore, a need has arisen for a system and method which manages peripheral camera interactions at an information handling system and display.

In accordance with the present invention, a system and method are provided which substantially reduce the disadvantages and problems associated with previous methods and systems for managing peripheral camera interactions at an information handling system and display. A predetermined touch input at a peripheral camera housing, such as a tap, automatically commands presentation of settings on screen display menu at a display associated with the peripheral camera. A capacitive touch screen display detects a metallic housing of the peripheral camera to apply the position of the peripheral camera relative to the display to adjust presentation of visual images at the display.

More specifically, an information handling system processes information with a processor and memory disposed in a housing and presents the information as visual images at a peripheral display. A peripheral camera separate from the display captures visual images for use by the information handling system and for presentation at the display, such as to participate in a video conference. A controller in the peripheral camera has a processing resource that detects a predetermined end user touch at the peripheral camera, such as a tap, and in response initiates presentation of a settings on screen display menu to control operations of the peripheral camera. A capacitive touch screen disposed in the display panel includes proximity detection that determines a position of the peripheral camera, such as by detecting capacitance related to a metallic housing of the peripheral camera. The peripheral camera position is applied to adjust presentation of visual images on the display. For example, when a settings on screen display menu presentation is commanded by a tap on the camera housing, the menu is presented near the position of the peripheral camera to provide a more intuitive presentation to the end user that associates the user interface with the peripheral camera. As another example, windows of content are moved for presentation at the display based upon the location of the peripheral camera. For instance, an active video conference window is presented near the camera position to align the end user's gaze with the camera and the video conference participant. As another example, content is arranged, such as with a split line between different types of content, so that the position of the peripheral camera will not block an end user from viewing the content.

The present invention provides a number of important technical advantages. One example of an important technical advantage is that a peripheral camera settings menu is presented for end user inputs in response to a tap at the peripheral camera housing so that an end user quickly accesses and closes the camera settings options without having to interact through an operating system or other user interface hosted by an information handling system to open the settings menu. The peripheral camera settings user interface is presented at a display proximate the position of the peripheral camera to provide a more intuitive experience to the end user. The camera position is determined with proximity detection of a touch screen display capacitive touch sensor layer. In addition to coordinating a display location for presentation of the display settings user interface, proximity detection of the peripheral camera supports adjustments to display presentations in coordination with the camera position, such as aligning an active conversation video conference window with the camera so that the end user appears to be looking at the participant in captured visual images, and adjusting a split line of content presented at the display so that content is not blocked from view to the end user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system touch screen display and peripheral camera cooperate to coordinate presentation of visual images related to camera operations. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
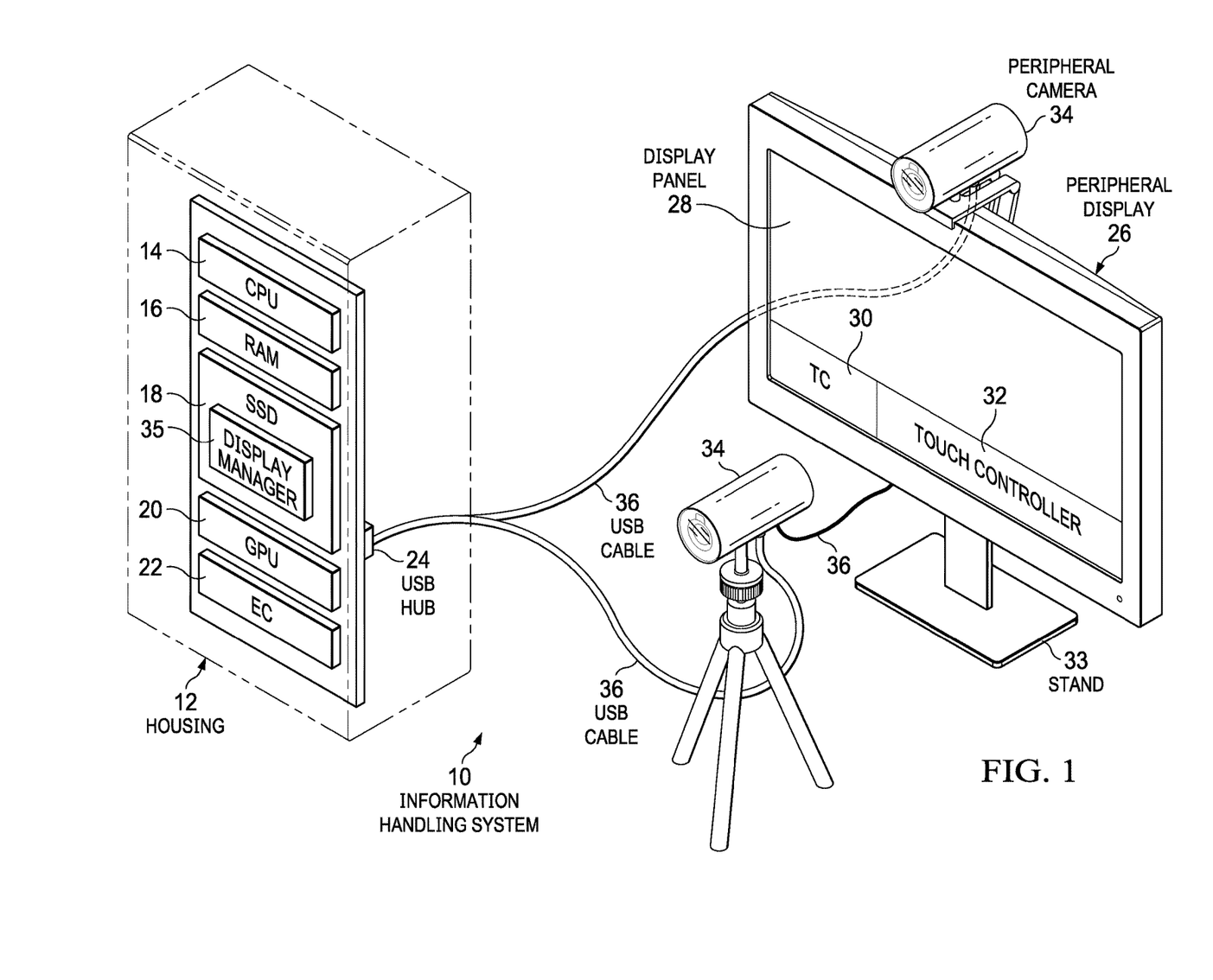
FIG. 1 depicts a block diagram of an information handling system configured to adjust visual images presented at a display based upon a position of a peripheral camera.

Referring now to FIG. 1, a block diagram depicts an information handling system 10 configured to adjust visual images presented at a peripheral display 26 based upon a position of a peripheral camera 34. Information handling system 10 holds processing components in a housing 12 configured as a stationary system, such as a desktop. Alternative embodiments may hold processing components in a portable housing having an integrated display. In the example embodiment, a central processing unit (CPU) 14 executes instructions that process information for presentation as visual images at peripheral display 26. A random access memory (RAM) 16 interfaces with CPU 14 to store the instructions and information. A solid state drive (SSD) 18 provides persistent storage of the instructions and information during power down states. For example, SSD 18 stores an operating system and applications in non-transitory memory that are retrieved at power up of the system to RAM 16 for execution on CPU 14. A graphics processing unit (GPU) 20 further processes information for presentation as visual images at a display panel 28 of peripheral display 26, such as by defining pixel values of colors at pixels of display panel 28. An embedded controller 22 interfaces with CPU 14 to manage operating conditions within housing 12 and interactions of CPU 14 with peripheral devices, such as keyboard, a mouse and a capacitive touch screen integrated with display panel 28 to accept end user touch inputs. A USB hub 24 interfaces with CPU 14 to support communications with external devices through USB cables. For example, a USB Type C cable 36 supports communication of visual information from GPU 20 to display panel 28 and communication of visual information from a peripheral camera 34 to GPU 20 and CPU 14. In the example embodiment, peripheral camera 34 also directly interfaces with a USB Type C cable 36 to display panel 28. A display manager 35 stored in SSD 18 and executed on CPU 14 manages presentation of visual images captured by peripheral camera 34 at display 26, such as with an operating system driver or separate application relationship.

Peripheral display 26 presents visual information with pixels of a display panel 28, such as an LCD or OLED display panel. For instance, a timing controller 30 or other processing resource scans pixel values received from GPU 20 or peripheral camera 34 to pixels of display panel 28. A touch controller 32 interfaces with a touch screen integrated in display panel 28 and communicates locations of detected touches to embedded controller 22 through Type-C USB cable 36. A stand 33 or other display housing hold display panel 28 in a raised vertical position for viewing of visual images by an end user. Peripheral camera 34 is depicted in one configuration held by a stand on a support surface and in another configuration clamped with a bracket to an upper side of peripheral display 26. An advantage to placement of peripheral camera 34 on a stand is that it can have a position closer to an end user than the display for a better image capture to support videoconferencing. For instance, many larger displays present large and high quality visual images viewed by an end user at a distance from the display. When peripheral camera 34 couples to peripheral display 26, the distance to the end user may be significant so that the end user will appear small or distant in the captured visual image. A disadvantage is that peripheral camera 34 may interfere with an end user's view of display panel 28.

Figure 2:
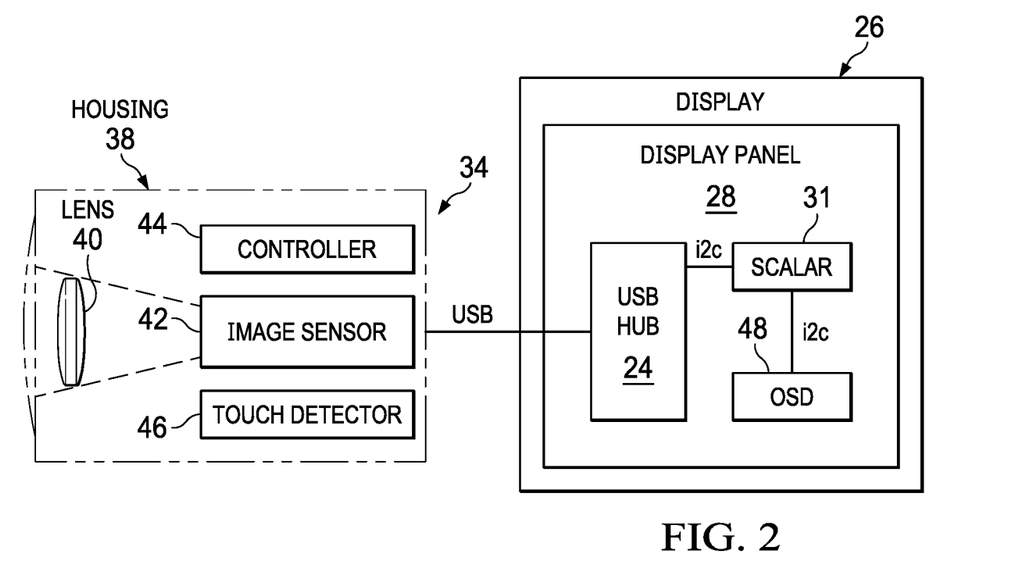
FIG. 2 depicts a block diagram of a peripheral camera configured to present a settings on screen display menu responsive to detection of an end user tap at the peripheral camera housing.

Referring now to FIG. 2, a block diagram depicts a peripheral camera 34 configured to present a settings on screen display menu at a display 26 responsive to detection of an end user tap at the peripheral camera housing 38. A lens 40 in peripheral camera housing 38 directs light at an image sensor 42, which captures visual images with the light and provides the captured visual images to a display panel 28 through a USB hub 24 of display 26. A controller 44 or other similar processing resource manages operations of peripheral camera 34, such as lighting settings, power settings or other types of settings that define operations of peripheral camera 34. Controller 44 communicates a command to initiate a settings on screen display to an on screen display (OSD) module 48, such as firmware module stored in non-transitory memory of scalar 31 for execution. For instance, an on screen display module 48 stored in flash memory or other non-transient memory executes on scalar 31 to generate a menu for presentation at display 26 that accepts end user camera settings, such through a touch screen display panel 28. For instance, OSD module 48 can generate a visual image directly from local memory or based on information communicated to display 26 for presentation to accept end user settings, or can provide a settings menu from a host information handling system to present at the display through its GPU. A touch detector 46 interfaced with controller 44 detects touches at peripheral camera housing 38 to command presentation of the settings on screen display menu by controller 44 to OSD module 48. For instance, an end user may initiate presentation of the settings on screen display module by a tap at peripheral camera housing 38, which is detected by a capacitive touch sensor interfaced with the housing material. In alternative embodiments, other types of sensors may detect the tap, such as with a change in ground at the housing.

Figure 3A:
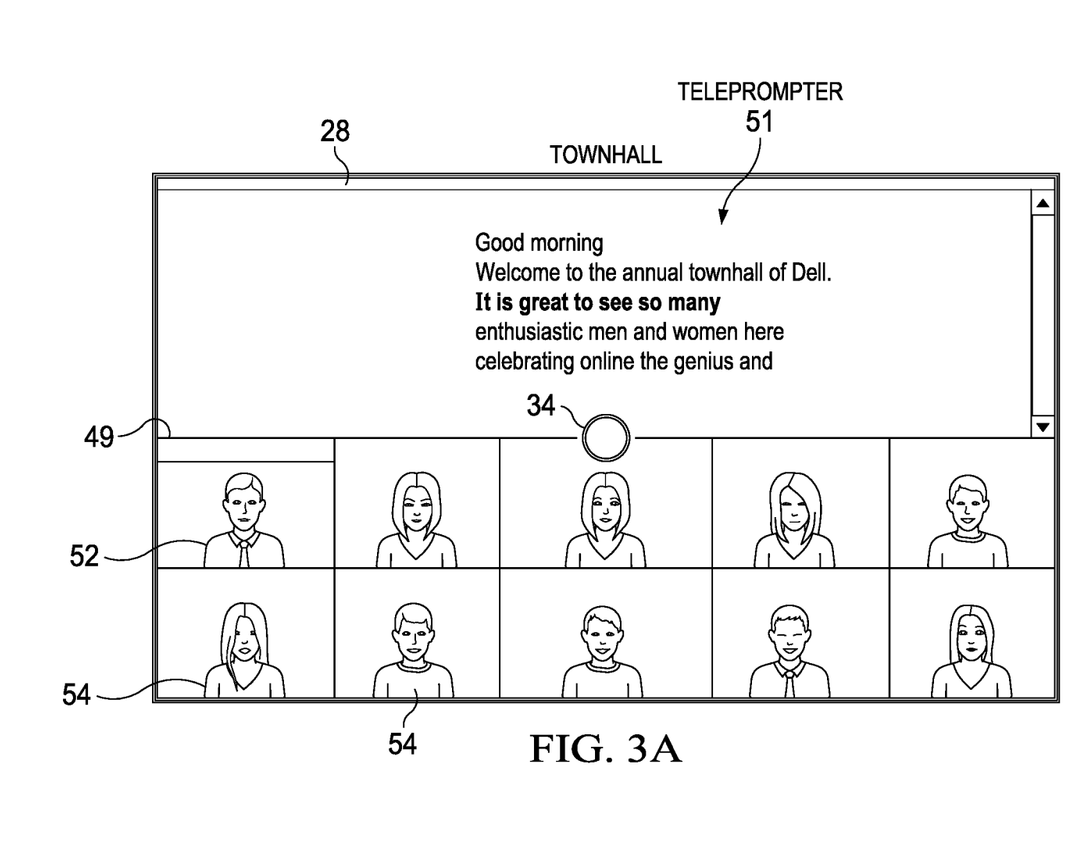
FIGS. 3A, 3B and 3C depict examples of display presentations that adapt based upon peripheral camera position.
Figure 3B:
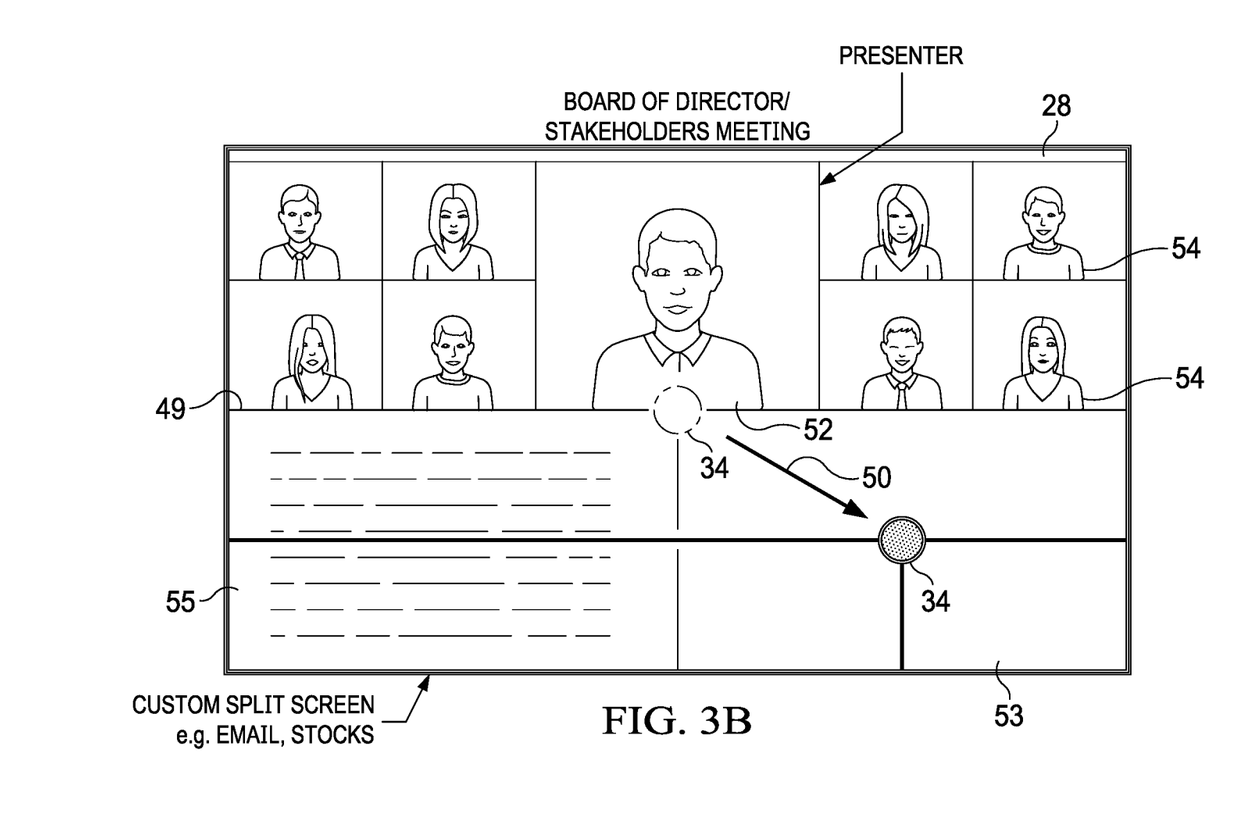
Figure 3C:
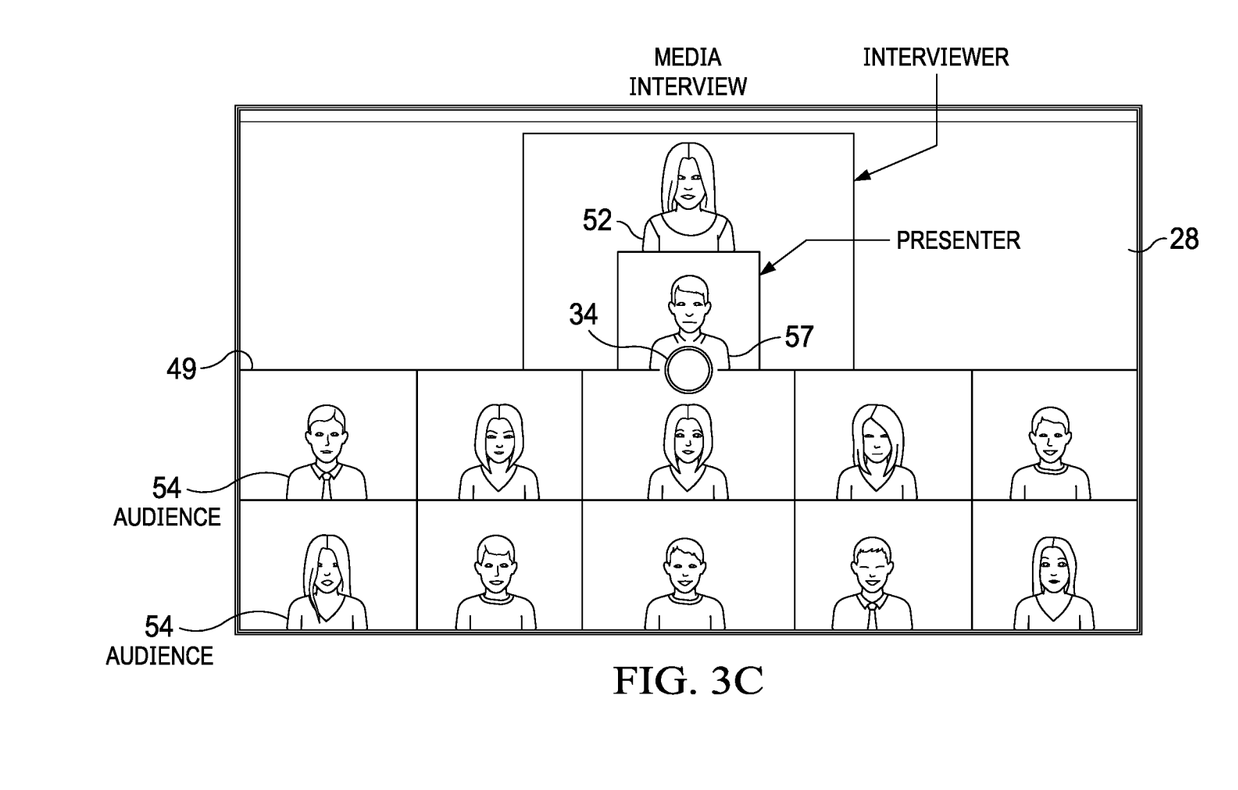

Referring now to FIGS. 3A, 3B and 3C, examples are depicted of display presentations that adapt based upon peripheral camera 34 position. A townhall video conference presentation example is depicted by FIG. 3A having display panel 28 divided by a split screen line 49 into a teleprompter portion 51 and a participant portion 52 having plural video conference windows 54 that present visual images of participants of the townhall. In the example embodiment, camera 34 is held in a raised position by a stand at a middle position of display panel 28. The position of camera 34 is detected by a touch screen of display panel 28 so that split screen line 49 is aligned with the position of peripheral camera 34. An end user making a presentation with teleprompter 51 has a clear view of the teleprompter text and of all the participants of the townhall by having the video conference windows 54 shown so that they are not blocked by peripheral camera 34. For example, the display manager operating on the information handling system CPU receives the position information of peripheral camera 34 determined by touch screen controller of display panel 28 and applies the position to present video images so that peripheral camera 34 is not between the end user and the video images.

FIG. 3B depicts an example in which movement of peripheral camera 34 is detected so that visual images presented at display panel 28 are adjusted to the new peripheral camera 34 position. Movement of peripheral camera 34 is detected by changes in capacitance detected at the touch screen of display panel 28, as indicated by arrow 50. With movement of peripheral camera 34, split line 49 may move to provide an updated boundary for presentation of video conference windows 54, as indicated by arrow 50. As a result of the change in split 49 a data windows 53 and 55 change shape and size. In one example embodiment, the ratio of screen space may be kept consistent for each portion of the display information. In one example embodiment, data window 55 presents the settings on screen display menu for peripheral camera 34 to control camera operations, such as light capture settings, power settings, sleep modes, resolution, lens zoom and similar settings.

FIG. 3C depicts an example in which a media interview is performed by a videoconference. Peripheral camera 34 has a central position with a split line 49 located at the position of peripheral camera 34. In a participant portion 52, an interviewer captured by peripheral camera 34 is presented directly above the location of peripheral camera 34 so that an appearance is provided of interviewer looking at a presenter 57 who is the individual participating in the interview. In various embodiments, a video conference widow 54 having an active conversation with the user of peripheral camera 34 is placed co-location with peripheral camera 34 so that the user is looking directly into the camera while looking at the participant of the active conversation.

Figure 4:
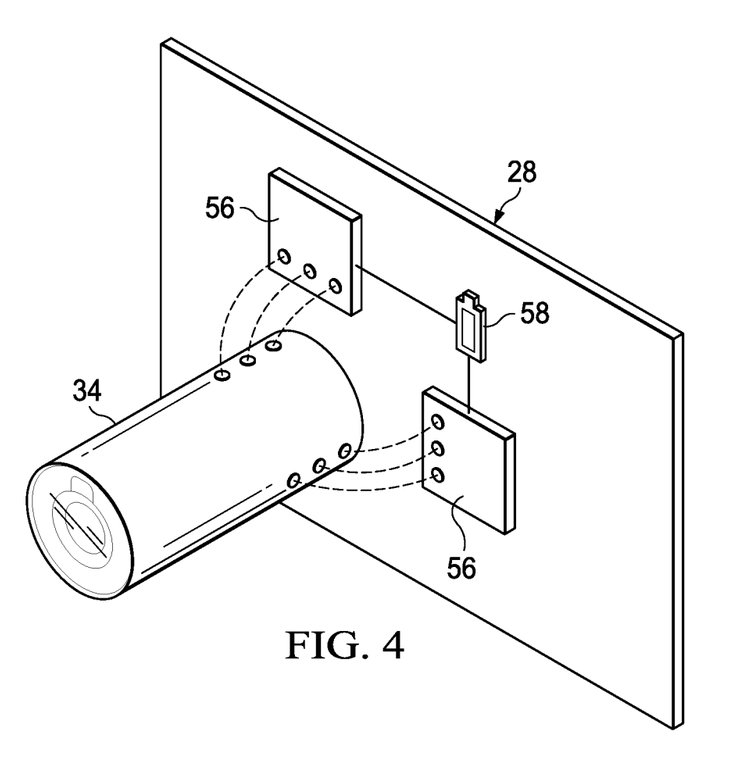
FIG. 4 depicts peripheral camera interactions with a capacitive touch screen display that determine peripheral camera position for adjusting display visual image presentation.

Referring now to FIG. 4, peripheral camera 34 interactions with a capacitive touch screen display panel 28 that determine peripheral camera position for adjusting display visual image presentation. A capacitive touch screen display panel detects the metal outer housing of peripheral camera 34 over a proximity distance and without a touch of the camera housing against the touch screen display. Essentially, the capacitive touch screen sensor has a plurality of capacitive plates 56 that receive a charge 58 so that a proximity of the metal camera housing interacts with the electric field created by the capacitive plates 56 and charge 58. The electric field polarizes metal of the body so that energy is transferred to the polarized charges, leaving the capacitive plates with a lower potential that draws in additional charge and returning equilibrium. The storage of charge in capacitive plates due to the presence of the metal webcam body increases capacitance to allow detection of an X, Y position of peripheral camera 34. Refinement of the position information, including a distance between touch screen display panel 28 and peripheral camera 34 is provided with storage of capacitive characteristics of peripheral camera 34 on the peripheral display.

Logic to determine a camera position and to apply the camera position to adjust visual images presented at the display may execute with cooperation of a variety of processing resources that execute instructions stored in non-transitory memory, such as flash embedded in a controller. For example, a determination of camera position may be performed by a touch controller that compares detected capacitance with an expected camera profile. Alternatively, capacitance from the touch screen may be forwarded to an information handling system for analysis by instructions executing on a CPU, such as an operating system display driver, or an embedded controller. In another alternative embodiment, peripheral camera 34 may include processing resources of a controller that analyze display capacitance to determine a camera position that is reported to the display and/or information handling system. The positioning of visual images at the display based upon the camera position may be managed with a display manager executing on an information handling system or on the display itself.

Figure 5:
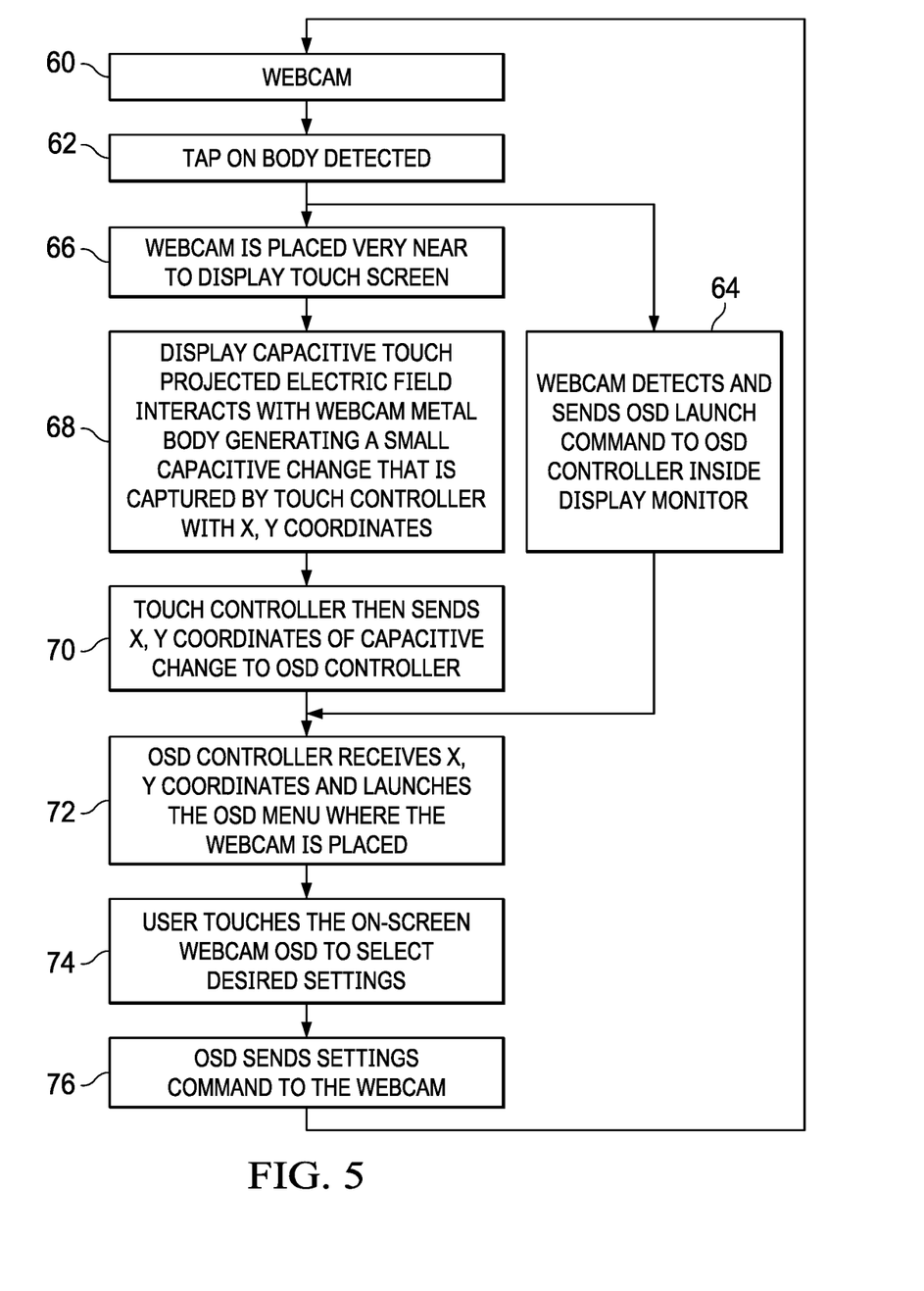
FIG. 5 depicts a flow diagram of a process for direct launch of a peripheral camera settings on screen display menu at a touch screen display from detection of an end user tap at the peripheral camera housing.

Referring now to FIG. 5, a flow diagram of a process for direct launch of a peripheral camera settings on screen display menu at a touch screen display from detection of an end user tap at the peripheral camera housing. The process starts at step 60 with an active peripheral camera that, at step 62, receives a finger tap at its housing to indicate an end user desire to adjust camera settings. At step 64 the peripheral camera detects the tap on the housing and sends an on screen display launch command to the camera controller and display for initiation of the presentation of a settings on screen display menu. At step 66, the peripheral camera is placed at a location near the capacitive touch screen display panel of the peripheral display. At step 68, the display capacitive touch projected electrical field interacts with the peripheral camera metal body to generate a capacitive change captured by the display touch controller, which provides an X, Y position of the peripheral camera. At step 70, the touch controller sends the peripheral camera X, Y coordinates to the on screen display controller. At step 72, the on screen display controller receives the X, Y coordinates and launches the settings on screen display menu at the location where the peripheral camera is placed. In this manner, the user is provided with the settings menu to adjust camera settings at a location proximate to the camera. At step 74, the end user interacts with the touch screen display panel to adjust the on screen display settings to the desired settings. At step 76, the display on screen display controller sends setting selections to the peripheral camera. When the end user completes the settings changes, another tap on the peripheral camera metal housing closes the settings on screen display menu.

Figure 6:
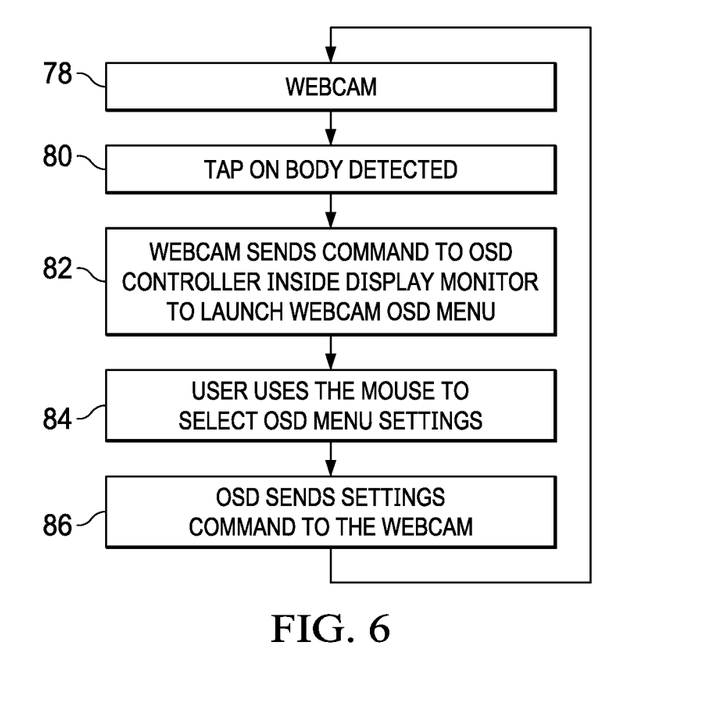
FIG. 6 depicts a flow diagram of a process for presentation of an on screen display menu at a display lacking a touch screen.

Referring now to FIG. 6, a flow diagram depicts a process for presentation of a settings on screen display menu at a display lacking a touch screen. The process starts at the peripheral camera at step 78 at which an end user performs a tap on the housing at step 80 to indicate a desire to present the settings on screen display menu. At step 82, the peripheral camera responds to detection of the tap at the housing y sending a command to the display on screen display controller to launch the peripheral camera settings on screen display menu. At step 84, the end user inputs peripheral camera settings through a mouse at the settings on screen display menu. At step 86, the on screen display sends the settings commands to the peripheral camera, such as with communication coordinated by an information handling system operating system.

Figure 7:
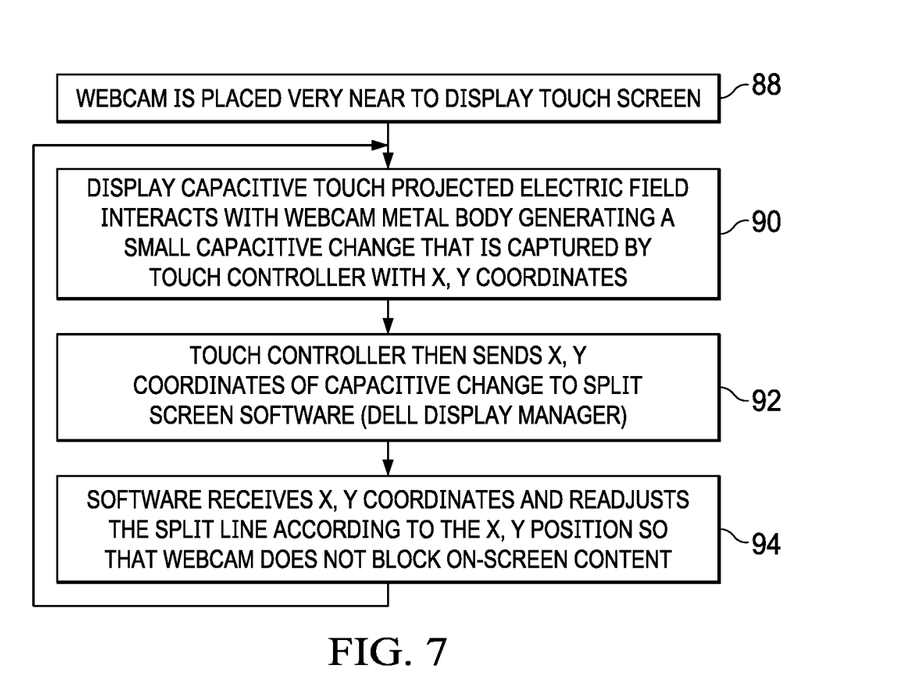
FIG. 7 depicts a flow diagram of a process for configuration of a display split screen presentation based upon peripheral camera position.

Referring now to FIG. 7, a flow diagram depicts a process for configuration of a display split screen presentation based upon peripheral camera position. The process starts at step 88 with peripheral camera placement near a touch screen display panel so that the metal housing of the peripheral camera induces a change in capacitance at the touch screen. At step 90, the display capacitive touch electric field interacts with the metal body of the peripheral camera to generate a small capacitance change that is captured by the touch screen controller and reported as an X, Y position. At step 92, the touch controller sends the X, Y position coordinates for the detected capacitive change to the information handling system display manager for a determination of an adjustment to the presentation of visual images at the display based upon the peripheral camera position. At step 94, the display manager receives the X, Y coordinates and readjusts the split line of the display that divides visual image presentation areas so that the peripheral camera does not block on-screen content. The presentation of visual images may be adjusted to avoid interference by the camera in a view of defined areas of the presentation as well as by aligning particular visual image content with the peripheral camera position, such as an active conversation video conference window.

Although the present invention has been described in detail, it should be understood that various changes, substitutions and alterations can be made hereto without departing from the spirit and scope of the invention as defined by the appended claims.

What is claimed is:

1. A method for presenting visual images at a display, the method comprising:
   detecting with a touch screen of the display a position of a camera housing separate from the display relative to the display by sensing proximity of the camera housing to the touch screen;
   applying the position of the camera housing to arrange presentation of visual images at the display;
   detecting moving of the camera from a first position relative to the display to a second position relative to the display; and
   in response to the moving the camera, re-arranging the presentation of the visual images.

2. The method of claim 1 further comprising:
   presenting visual images of a video conference window at the display having an active conversation; and
   arranging the video conference window to align with the camera position.

3. The method of claim 1 further comprising:
   presenting a split screen video conference format having first content and second content divided by a split; and
   aligning the split based upon the camera position.

4. The method of claim 1 further comprising:
   detecting an end user tap at a housing of the peripheral camera; and
   in response to the detecting the end user tap, automatically presenting a settings on screen display menu at the display.

5. The method of claim 4 further comprising:
   applying the location of the peripheral camera to present the settings on screen display menu at a portion of the display associated with the location of the peripheral camera.

6. The method of claim 5 further comprising:
   generating the settings on screen display menu with a processing resource of the peripheral camera.

7. A system for managing a location for presentation of visual images at a display, the system comprising:
   a processing resource;
   non-transitory memory interfaced with the processing resource; and
   instructions stored on the non-transitory memory that when executed on the processing resource cause:
   detecting with a touch screen of the display a position of a camera housing separate from the display relative to the display by sensing proximity of the camera housing to the touch screen;

applying the position of the camera housing to arrange presentation of visual images at the display;

presenting a split screen video conference format having first content and second content divided by a split; and aligning the split based upon the camera position.

8. The system of claim 7 wherein the instructions further cause:

detecting an end user tap at a housing of the peripheral camera; and in response to the detecting the end user tap, automatically presenting a settings on screen display menu at the display.

9. The system of claim 8 wherein the instructions further cause applying the location of the peripheral camera to present the settings on screen display menu at a portion of the display associated with the location of the peripheral camera.

10. An information handling system comprising:

a housing;

a processor disposed in the housing and operable to execute instructions that process information;

a memory disposed in the housing and interfaced with the processor, the memory operable to store the instructions and information;

a display interfaced with the processor and operable to present the information as visual images, the display having a capacitive touch screen having proximity sensing and operable to detect by proximity detection a location of the peripheral camera relative to the capacitive touchscreen; and a peripheral camera having a camera housing separate from the housing and separate from the display, the peripheral camera interfaced with the display to present visual images of the peripheral camera at the display, the peripheral camera having a controller and a touch detector, the touch detector operable to detect a predetermined touch at the camera housing of the peripheral camera, the controller automatically presenting a settings on screen display menu having camera settings for managing capture of visual images by the camera, the camera settings managed by the controller, the camera settings presented at the display in response to the predetermined touch at the camera housing;

wherein the processor applies the location of the camera as detected by the proximity detection of the display capacitive touch screen to adjust a position of content presented on the display and related to the camera.

11. The information handling system of claim 10 further comprising:

a direct cable interface between the peripheral camera and the display;

wherein the peripheral camera controller generates the on screen display menu for presentation without communication of the on screen display menu through the processor.

12. The information handling system of claim 11 wherein the peripheral camera controller applies the location of the peripheral camera to present the on screen display menu at a portion of the display associated with the location of the peripheral camera.

13. The information handling system of claim 12 wherein the peripheral camera controller when presenting the settings on screen display menu automatically removes the settings on screen display menu in response to the predetermined touch at the camera housing.

14. The information handling system of claim 11 further comprising a display manager executing on the processor and interfaced with the display to apply the location of the peripheral camera location to place video conference windows at the display.

15. The information handling system of claim 14 wherein the display manager aligns a video conference window with an active conversation for presentation at the peripheral camera location.

16. The information handling system of claim 14 wherein the display manager aligns a video content window distal the peripheral camera location.

17. The information handling system of claim 14 wherein capacitive touch screen is further operable to detect movement of the camera from a first to a second position and the display manager adjusts the placement of the video conference windows in response to the detecting movement of the camera.

* * * * *